United States Patent
Chen et al.

(10) Patent No.: US 11,602,848 B2
(45) Date of Patent: Mar. 14, 2023

(54) ROBOT CONTROL METHOD, COMPUTER-READABLE STORAGE MEDIUM AND ROBOT

(71) Applicant: UBTECH ROBOTICS CORP LTD, Shenzhen (CN)

(72) Inventors: Chunyu Chen, Shenzhen (CN); Yizhang Liu, Shenzhen (CN); Ligang Ge, Shenzhen (CN); Zheng Xie, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 253 days.

(21) Appl. No.: 17/120,229

(22) Filed: Dec. 13, 2020

(65) Prior Publication Data
US 2021/0178588 A1 Jun. 17, 2021

(30) Foreign Application Priority Data
Dec. 13, 2019 (CN) .......................... 201911279545.X

(51) Int. Cl.
B25J 9/16 (2006.01)
B25J 13/08 (2006.01)

(52) U.S. Cl.
CPC ............ *B25J 9/1664* (2013.01); *B25J 9/1651* (2013.01); *B25J 9/1694* (2013.01); *B25J 13/085* (2013.01); *B25J 13/088* (2013.01)

(58) Field of Classification Search
CPC ...... B25J 9/1664; B25J 9/1651; B25J 9/1694; B25J 13/085; B25J 13/088; B25J 9/16; B25J 9/1682; B62D 57/032
See application file for complete search history.

(56) References Cited

U.S. PATENT DOCUMENTS

| | | | |
|---|---|---|---|
| 5,459,659 A * | 10/1995 | Takenaka ............. | B62D 57/032 901/33 |
| 2005/0151497 A1* | 7/2005 | Nagasaka ............ | B62D 57/032 318/568.12 |
| 2009/0005906 A1* | 1/2009 | Tajima ................. | B62D 57/032 901/1 |
| 2013/0173054 A1* | 7/2013 | Seo ...................... | B62D 57/032 901/1 |
| 2018/0028861 A1* | 2/2018 | Murakoshi ........... | A61B 5/6895 |

* cited by examiner

*Primary Examiner* — Abby Y Lin
*Assistant Examiner* — Dylan M Katz

(57) ABSTRACT

A robot control method includes: obtaining force information associated with feet of the robot; calculating a zero moment point of a COM of a body of the robot based on the force information; updating a position trajectory of the robot according to the zero moment point of the COM of the body to obtain an updated position of the COM of the body; obtaining posture information of the robot; updating a posture trajectory of the robot according to the posture information to obtain an updated pose angle; performing inverse kinematics analysis on the updated position of the COM of the body and the updated pose angle to obtain joint angles of legs of the robot; and controlling the robot to move according to the joint angles.

18 Claims, 11 Drawing Sheets

US 11,602,848 B2

ROBOT CONTROL METHOD, COMPUTER-READABLE STORAGE MEDIUM AND ROBOT

CROSS REFERENCE TO RELATED APPLICATIONS

This application claims priority to Chinese Patent Application No. CN201911279545.X, filed Dec. 13, 2019, which is hereby incorporated by reference herein as if set forth in its entirety.

BACKGROUND

1. Technical Field

The present disclosure generally relates to robots, and particularly to a control method for controlling a biped robot.

2. Description of Related Art

Some conventional biped robots adopt position-planning based gait walking methods. In the case of interference from various external environmental forces or uneven ground, the stability of the robots is poor and it is difficult for the robots to walk stably. Therefore, there is a need to provide a robot control method to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
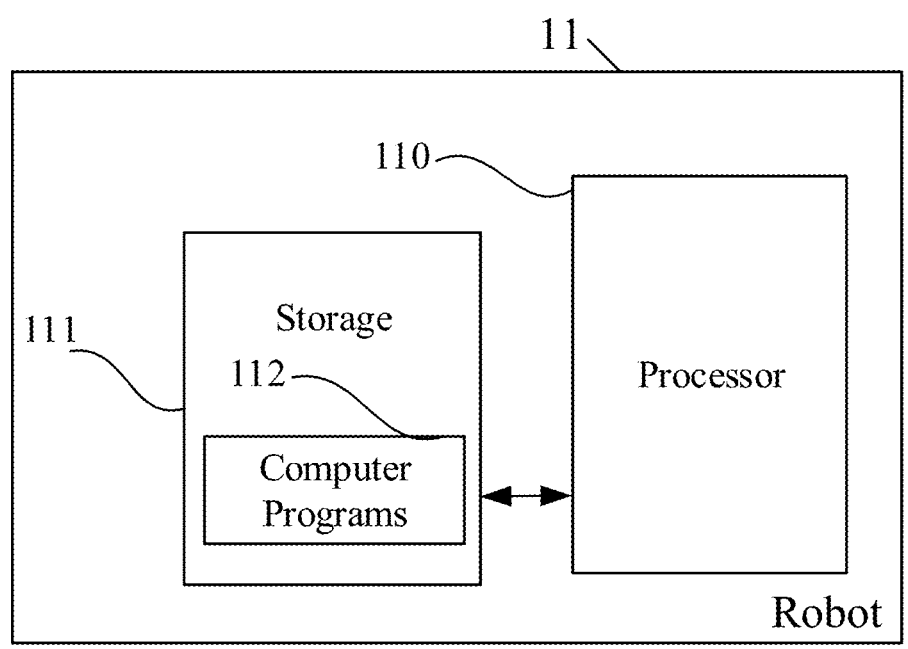
FIG. 1 is a schematic block diagram of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

FIG. 1 is a schematic block diagram of a robot 11 according to one embodiment. The robot 11 may be a biped robot. The robot 11 includes a processor 110, a storage 111, one or more computer programs 112 stored in the storage 111 and executable by the processor 110. When the processor 110 executes the computer programs 112, the steps in the embodiments of the method for controlling the robot 11, such as steps S101 through S107 in FIG. 2, steps S1021 to S1023 in FIG. 5, steps S1031 through S1034 in FIG. 6, steps S1051 through S1054 in FIG. 7, and functions of modules/units in the embodiments, such as units 701 through 707 in FIG. 8, units 7051 through 7054 in FIG. 9, units 7031 through 7034 in FIG. 10, and units 7021 through 7023 in FIG. 11 are implemented.

Exemplarily, the one or more computer programs 112 may be divided into one or more modules/units, and the one or more modules/units are stored in the storage 111 and executed by the processor 110. The one or more modules/units may be a series of computer program instruction segments capable of performing specific functions, and the instruction segments are used to describe the execution process of the one or more computer programs 112 in the robot 11. For example, the one or more computer programs 112 may be divided into a force information acquiring module, a zero moment point calculating module, a position trajectory updating module, a posture information acquiring module, a posture trajectory updating module, an inverse dynamics analyzing module, and a motion control module. The specific functions of each module will be described in detail later.

It should be noted that FIG. 1 is merely an example of the robot 11, and does not limit the robot 11. The robot 11 may include components different in numbers from those illustrated, or incorporate some other different components. For example, the robot 11 may further include an input and output device, a network access device, a bus, and the like.

The processor 110 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 111 may be an internal storage unit of the robot 11, such as a hard disk or a memory. The storage 111 may also be an external storage device of the robot 11, such as a plug-in hard disk, a smart memory card (SMC), and a secure digital (SD) card, or any suitable flash cards. Furthermore, the storage 111 may also include both an internal storage unit and an external storage device. The storage 111 is used to store computer programs, other programs, and data required by the robot. The storage 111 can also be used to temporarily store data that have been output or is about to be output.

Figure 2:
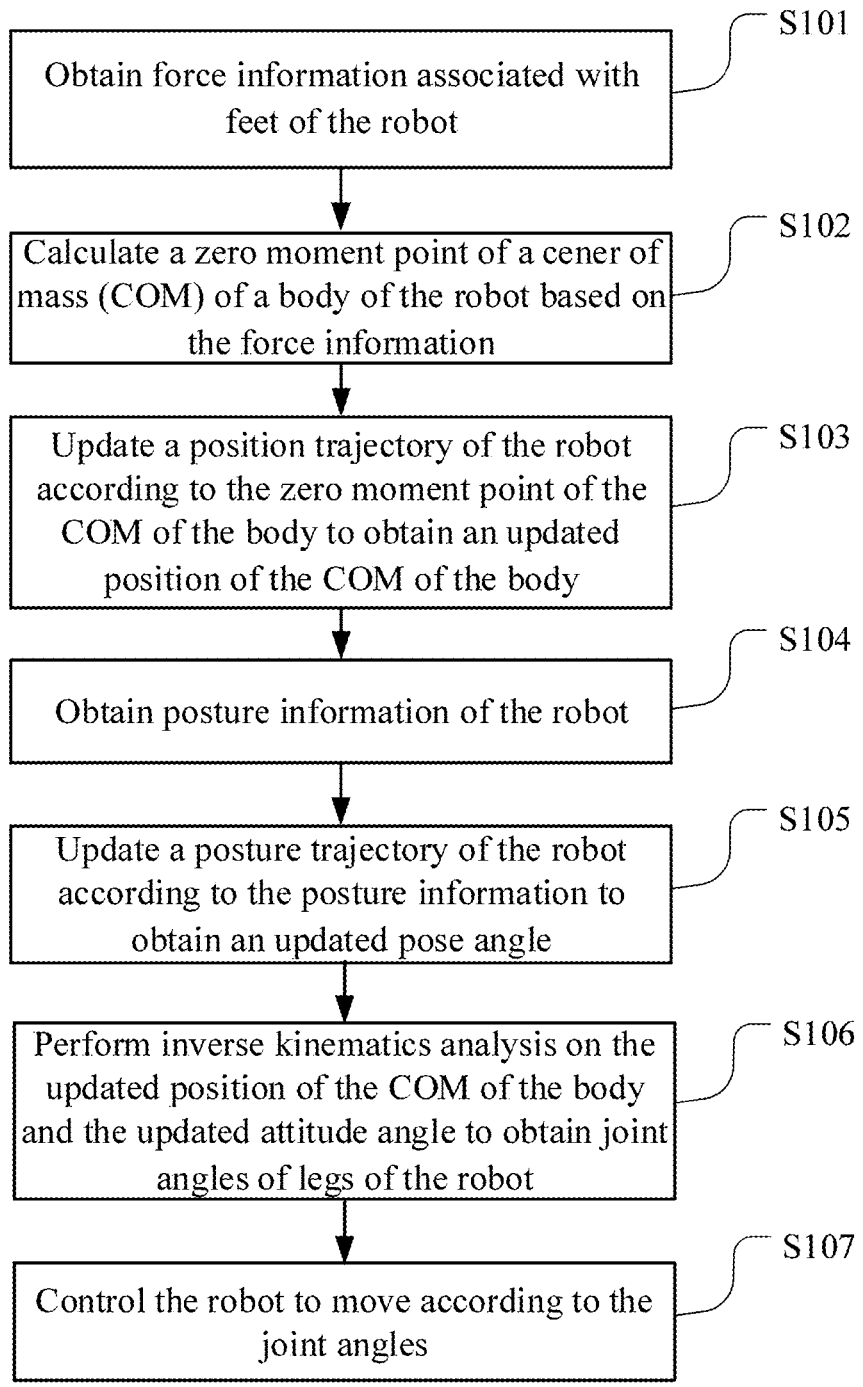
FIG. 2 is a schematic flowchart of a robot control method according to one embodiment.

FIG. 2 shows an exemplary flowchart of robot control method that may include the following steps.

Step S101: Obtain force information associated with feet of the robot.

Figure 3:
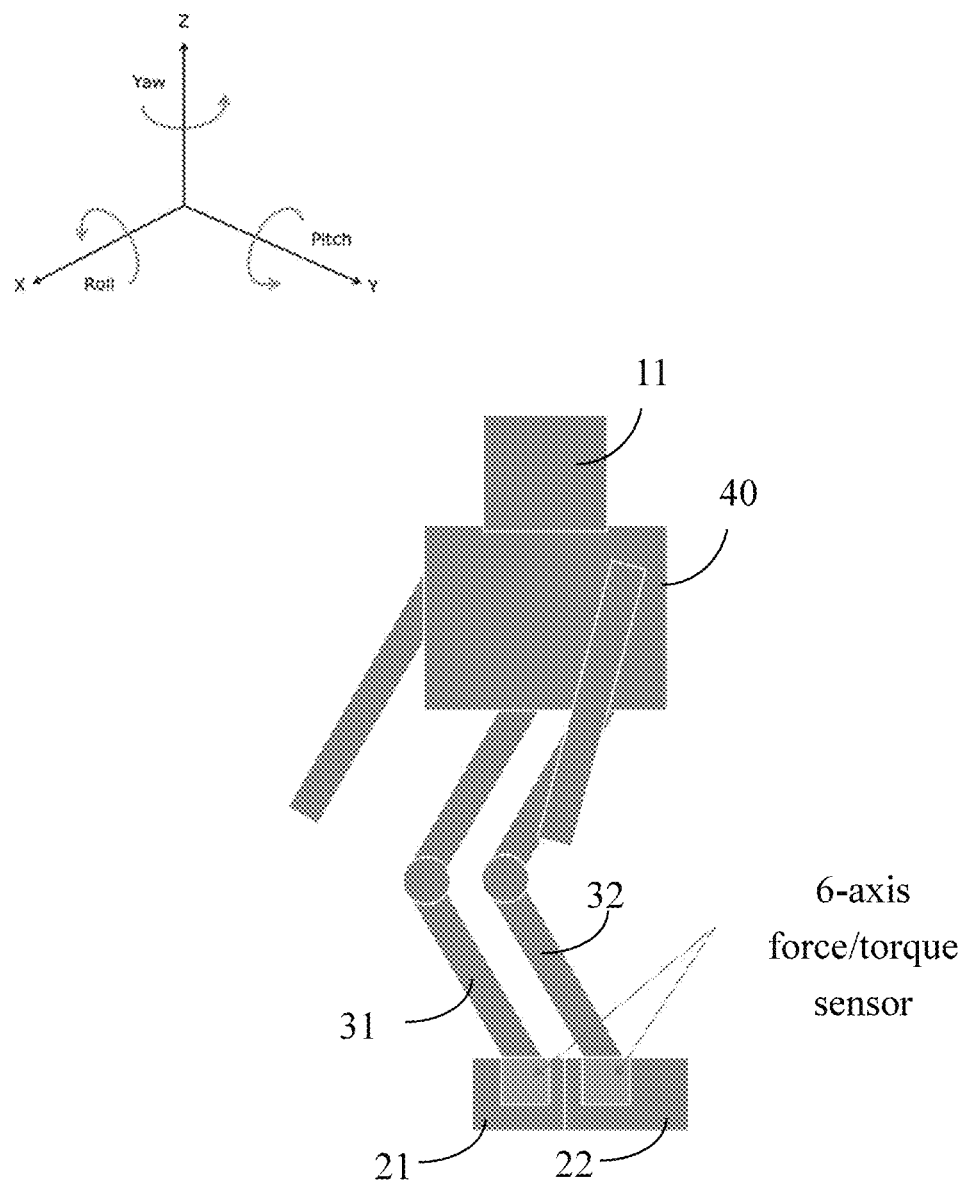
FIG. 3 is a schematic diagram showing a biped robot according to one embodiment.

In one embodiment, the robot 11 may be a biped robot and the force information associated with feet of the robot may include force information associated with the left foot of the robot 11 and force information associated with the right foot of the robot. As shown in FIG. 3, two sensors can be respectively arranged at the connecting portions between the left foot 22 and the left leg 32 of the robot 11, and between the right foot 21 and the right leg 31 of the robot 11 to obtain the force information associated with the left foot and the force information associated with the right foot of the robot 11.

In one embodiment, the sensors may be six-axis force/torque sensors that can detect the force information associated with the left foot 22 and the force information associated with the right foot 21. For example, in a three-dimensional coordinate system shown in FIG. 4 where x-axis and y-axis lie on the sole of the left foot 22 of the robot 11 and z-axis is perpendicular to the sole of the left foot 22, the force information of the left foot 22 includes three force components on the x-axis, y-axis and z-axis, and three torque components about the three axes. The force information of the left foot 22 can be expressed as follows: $F_l=[f_{lx}\ f_{ly}\ f_{lz}\ \tau_{lx}\ \tau_{ly}\ \tau_{lz}]^T$, where $f_{lx}$ represents the force component of the force information of the left foot on the x-axis, $f_{ly}$ represents the force component of the force information of the left foot on the y-axis, $f_{lz}$ represents the force component of the force information of the left foot on the z-axis, $\tau_{lx}$ represents the torque component of the force information of the left foot about the x-axis, $\tau_{ly}$ represents the torque component of the force information of the left foot about the y-axis, and $\tau_{lz}$ represents the torque component of the force information of the left foot about the z-axis.

Similarly, a three-dimensional coordinate system can be established for the right foot of the robot 11 where x-axis and y-axis lie on the sole of the right foot of the robot and z-axis is perpendicular to the sole of the right foot. The force information of the right foot can be expressed as follows: $F_r=[f_{rx}\ f_{ry}\ f_{rz}\ \tau_{rx}\ \tau_{ry}\ \tau_{rz}]^T$, where $f_{rx}$ represents the force component of the force information of the right foot on the x-axis, $f_{ry}$ represents the force component of the force information of the right foot on the y-axis, $f_{rz}$ represents the force component of the force information of the right foot on the z-axis, $\tau_{rx}$ represents the torque component of the force information of the right foot about the x-axis, $\tau_{ry}$ represents the torque component of the force information of the right foot about the y-axis, and $\tau_{rz}$ represents the torque component of the force information of the right foot about the z-axis.

Figure 5:
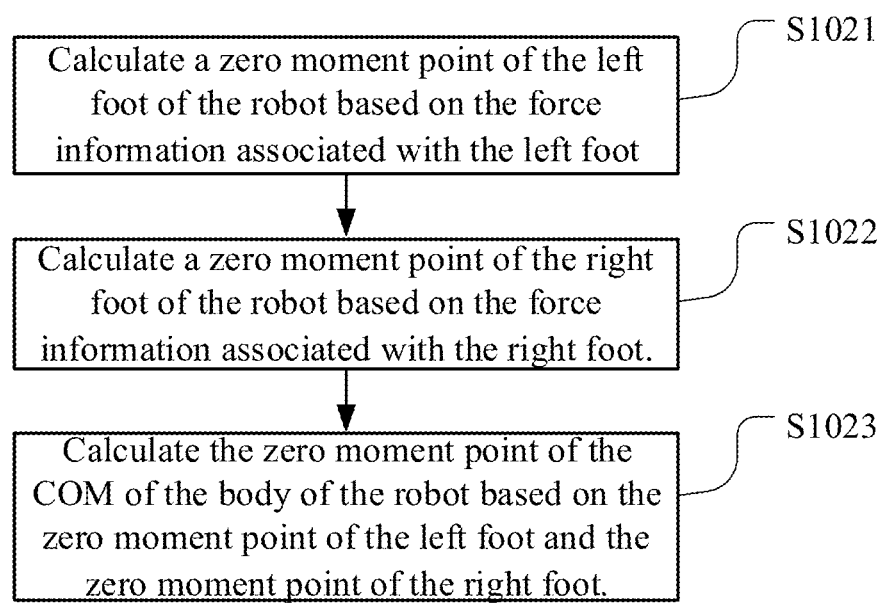
FIG. 5 is a schematic flowchart of method for calculating a zero moment point of a center of mass of a body of the robot.

Step S102: Calculate a zero moment point (ZMP) of a center of mass (COM) of a body 40 (see FIG. 3) of the robot 11 based on the force information. Referring to FIG. 5, in one embodiment, step S102 may include the following steps.

Figure 4:
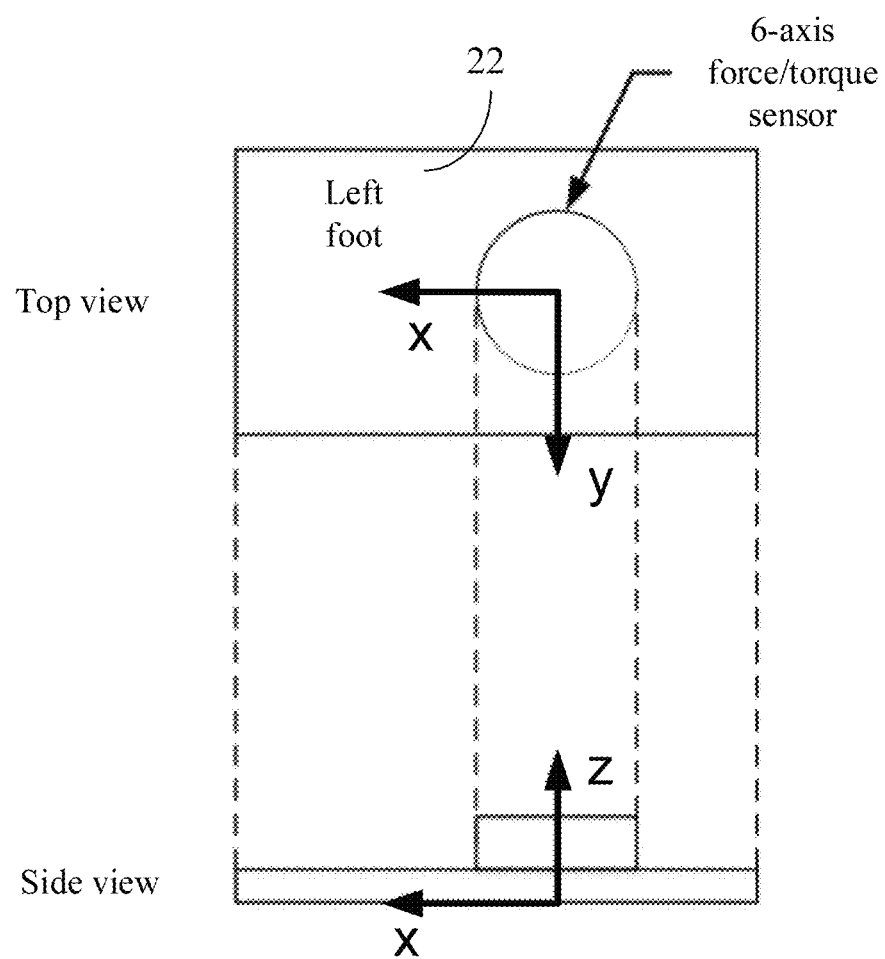
FIG. 4 shows a schematic diagram of a top view and a side view of a foot of the robot.

Step S1021: Calculate a zero moment point of the left foot of the robot 11 based on the force information associated with the left foot. Specifically, the ZMP of the left foot can be calculated according to formulas as follows:

$$p_{lx}=(-\tau_{ly}-f_{lx}d)/f_{lz}; p_{ly}=(-\tau_{lx}-f_{ly}d)/f_{lz}; p_l=[p_{lx}\ p_{ly}\ 0]^T,$$

where d represents a distance from the six-axis force/torque sensor of the left foot to the sole of the left foot, $p_{lx}$ represents an x-coordinate of the zero moment point of the left foot, $p_{ly}$ represents a y-coordinate of the zero moment point of the left foot, and $p_l$ represents the zero moment point of the left foot. In one embodiment, these variables are measured in a left foot coordinate system (e.g., a coordinate system as shown in FIG. 4).

Step S1022: Calculate a zero moment point of the right foot of the robot 11 based on the force information associated with the right foot. Specifically, the ZMP of the right foot can be calculated according to formulas as follows:

$$p_{rx}=(-\tau_{ry}-f_{rx}d)/f_{rz}; p_{ry}=(-\tau_{rx}-f_{ry}d)/f_{rz};$$

$p_r[p_{rx}\ p_{ry}\ 0]^T$, where d represents a distance from the six-axis force/torque sensor of the right foot to the sole of the right foot, $p_{rx}$ represents an x-coordinate of the zero moment point of the right foot, $p_{ry}$ represents a y-coordinate of the zero moment point of the right foot, and $p_r$ represents the zero moment point of the right foot. In one embodiment, these variables are measured in a right foot coordinate system where x-axis and y-axis lie on the sole of the right foot of the robot and z-axis is perpendicular to the sole of the right foot and passes through a center of the six-axis force/torque sensor on the right foot of the robot.

Step S1023: Calculate the zero moment point of the COM of the body of the robot 11 based on the zero moment point of the left foot and the zero moment point of the right foot. In one embodiment, the ZMP of the COM of the body of the robot 11 can be calculated according to formulas as follows:

$$p_{bx}=\frac{p_{rx}\times f_{rz}+p_{lx}\times f_{lz}}{f_{rz}+f_{lz}}; p_{by}=\frac{p_{ry}\times f_{rz}+p_{ly}\times f_{lz}}{f_{rz}+f_{lz}};$$

$p_b=[p_{bx}\ p_{by}\ 0]^T$, where $p_{bx}$ represents an x-coordinate of the zero moment point of the COM of the body, $p_{by}$ represents a y-coordinate of the zero moment point of the COM of the body, $p_b$ represents the zero moment point of the COM of the body. In one embodiment, the zero moment point of the COM of the body is a zero moment point measured in a COM coordinate system where the origin of the COM coordinate system lies on the COM of the body. That is, $p_{bx}$ represents a number that describes a horizontal position of the zero moment point in terms of distance and direction along the x-axis of the COM coordinate system, and $p_{by}$ represents a number that describes a horizontal position of the zero moment point in terms of distance and direction along the y-axis of the COM coordinate system.

Figure 6:
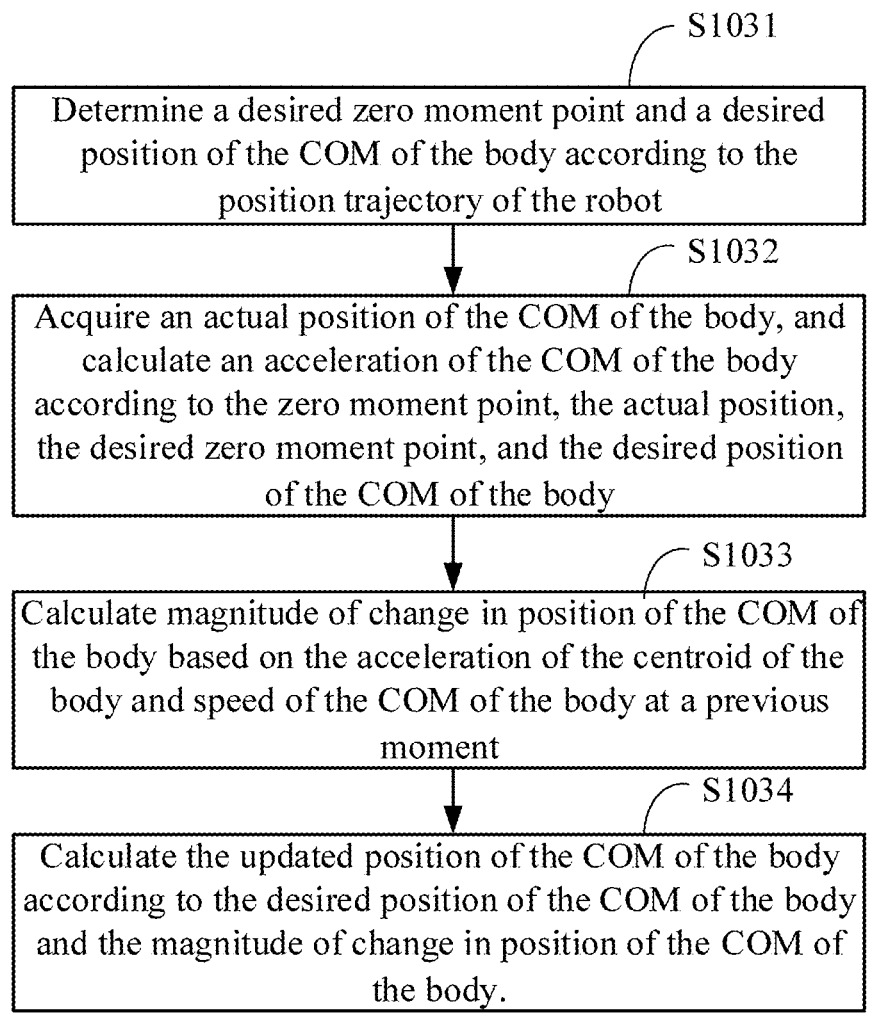
FIG. 6 is a schematic flowchart of method for updating a position trajectory of the robot according to one embodiment.

Step S103: Update a position trajectory of the COM of the robot according to the zero moment point of the COM of the body to obtain an updated position of the COM of the body. Referring to FIG. 6, in one embodiment, step S103 may include the following steps.

Step S1031: Determine a desired zero moment point and a desired position of the COM of the body according to the position trajectory of the robot 11.

Step S1032: Acquire an actual position of the COM of the body, and calculate an acceleration of the COM of the body according to the zero moment point, the actual position, the desired zero moment point, and the desired position of the COM of the body. In one embodiment, the acceleration of the COM of the body on the x-axis can be calculated according to a formula as follows: $a_x=K_{zmp}(p_{dx}-p_{bx})+K_p(x_{dx}-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K_{zmp}$ represents a preset first coefficient, $K_p$ represents a preset second coefficient, $a_x$ represents the acceleration of the COM of the body on the x-axis.

In one embodiment, the acceleration of the COM of the body on the y-axis can be calculated according to a formula as follows: $a_y = K_{zmp}(p_{dy} - p_{by}) + K_p(x_{dy} - x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a_y$ represents the acceleration of the COM of the body on the y-axis.

Step S1033: Calculate magnitude of change in position of the COM of the body based on the acceleration of the COM of the body and speed of the COM of the body at a previous moment. In one embodiment, the magnitude of change in the position of the COM of the body on the x-axis can be calculated according to the following formula:

$$\Delta x = v_x t + \frac{1}{2} a_x t^2,$$

where $v_x$ represents the speed of the COM of the body on the x-axis at a previous moment, t represents running time period of a preset program, $\Delta x$ represents the magnitude of change in the position of the COM of the body on the x-axis.

Similarly, the magnitude of change in the position of the COM of the body on the y-axis can be calculated according to the following formula:

$$\Delta y = v_y t + \frac{1}{2} a_y t^2,$$

where $v_y$ represents the speed of the COM of the body on the y-axis at a previous moment, t represents running time period of a preset program, $\Delta y$ represents the magnitude of change in the position of the COM of the body on the y-axis.

Step S1034: Calculate the updated position of the COM of the body according to the desired position of the COM of the body and the magnitude of change in position of the COM of the body.

In one embodiment, the x-coordinate of the updated position of the COM of the body can be calculated according to formula as follows: $x_{new} = x_{dx} + \Delta x$, where $x_{new}$ represents the x-coordinate of the updated position of the COM of the body. The y-coordinate of the updated position of the COM of the body can be calculated according to formula as follows: $y_{new} = x_{dy} + \Delta y$, where $y_{new}$ represents the y-coordinate of the updated position of the COM of the body.

Step S104: Obtain posture information of the robot.

In one embodiment, an inertial measurement unit (IMU) may be arranged in the robot. During the walking of the robot, the posture information of the robot can be obtained through the IMU. The posture information includes but is not limited to a roll angle and a pitch angle.

Figure 7:
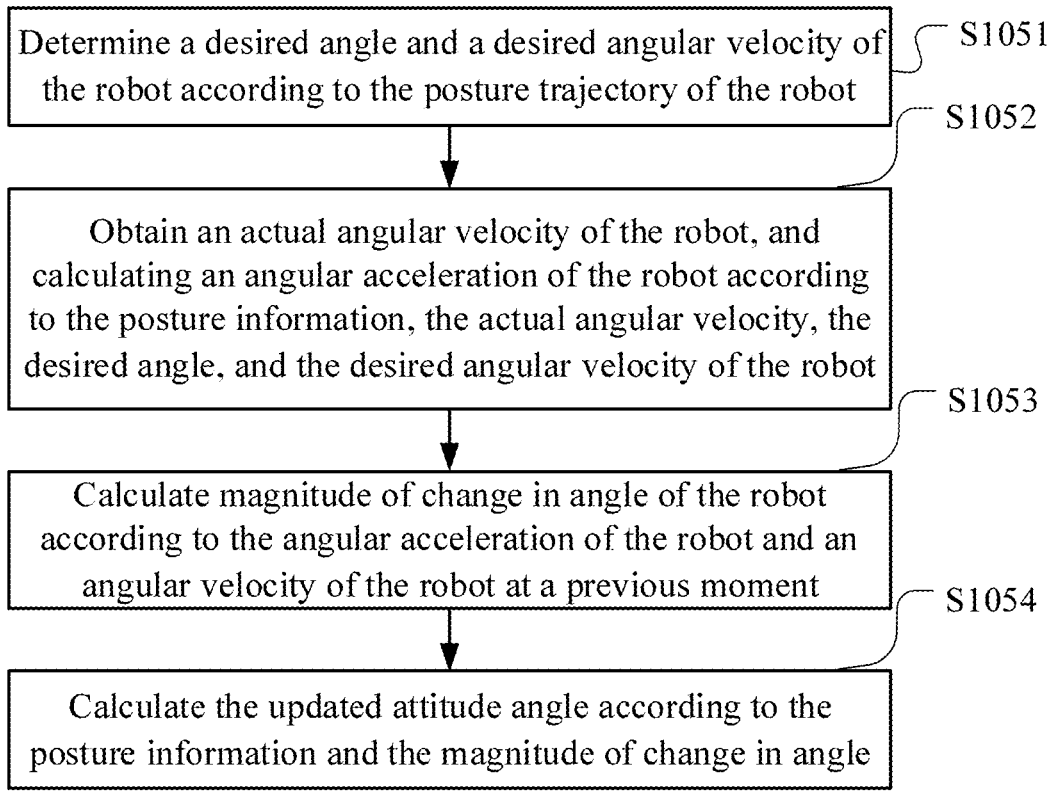
FIG. 7 is a schematic flowchart of method for obtaining an updated pose angle according to one embodiment.

Step S105: Update a posture trajectory of the robot according to the posture information to obtain an updated pose angle. Referring to FIG. 7, step S105 may include the following steps.

Step S1051: Determine a desired angle and a desired angular velocity of the robot according to the posture trajectory of the robot.

Step S1052: Obtain an actual angular velocity of the robot, and calculating an angular acceleration of the robot according to the posture information, the actual angular velocity, the desired angle, and the desired angular velocity of the robot.

In one embodiment, a roll angular acceleration of the robot can be calculated according to a formula as follows: $racc = K_{pr}(r_{dr} - r_r) + K_{dr}(w_{dr} - w_r)$, where $r_r$ represents a roll angle of the posture information, $r_{dr}$ represents a desired roll angle, $w_r$ represents an actual roll angular velocity around an x-axis, $w_{dr}$ represents a desired roll angular velocity around the x-axis, $K_{pr}$ represents a preset first coefficient, $K_{dr}$ represents a preset second coefficient, and racc represents the roll angular acceleration.

In one embodiment, a pitch angular acceleration of the robot can be calculated according to a formula as follows: $pacc = K_{pr}(r_{dp} - r_p) + K_{dr}(w_{dp} - w_p)$, where $r_p$ represents a pitch angle of the posture information, $r_{dp}$ represents a desired pitch angle, $w_p$ represents an actual pitch angular velocity around a y-axis, $w_{dp}$ represents a desired pitch angular velocity around the y-axis, and pacc represents the pitch angular acceleration.

Step S1053: Calculate magnitude of change in angle of the robot according to the angular acceleration of the robot and an angular velocity of the robot at a previous moment.

In one embodiment, a magnitude of change in roll angle can be calculated according to a formula as follows:

$$\Delta r = w_r t + \frac{1}{2} racc \times t^2,$$

where $w_r$ represents a roll angular velocity of the robot at a previous moment, t represents the running time period of a preset program, $\Delta r$ represents the magnitude of change in roll angle.

In on embodiment, a magnitude of change in pitch angle can be calculated according to a formula as follows:

$$\Delta p = w_p t + \frac{1}{2} pacc \times t^2,$$

where represents a pitch angular velocity of the robot at a previous moment, and $\Delta p$ represents the magnitude of change in pitch angle.

Step S1054: Calculate the updated pose angle according to the posture information and the magnitude of change in angle.

In one embodiment, an updated roll angle can be calculated according to a formula as follows: $r_{dr\_new} = r_{dr} + \Delta r$, where $r_{dr\_new}$ represents the updated roll angle.

In one embodiment, an updated pitch angle can be calculated according to a formula as follows: $r_{dp\_new} = r_{dp} + \Delta p$, where $r_{dp\_new}$ represents the updated pitch angle.

Step S106: Perform inverse kinematics analysis on the updated position of the COM of the body and the updated pose angle to obtain joint angles of legs of the robot.

Inverse kinematics analysis is an analysis method commonly used in the field of robotics. For details, please refer to any conventional inverse kinematics analysis process, which will not be repeated in the present disclosure.

In one embodiment, the joint angles of the left leg include a hip joint pitch angle, a hip joint yaw angle, a hip joint roll angle, a knee joint pitch angle, an ankle joint pitch angle, and an ankle joint roll angle that are associated with the left leg of the robot. The joint angles of the left leg are expressed as follows: $\theta_l=[\theta_{l1}\ \theta_{l2}\ \theta_{l3}\ \theta_{l4}\ \theta_{l5}\ \theta_{l6}]^T$.

In one embodiment, the joint angles of the right leg include a hip joint pitch angle, a hip joint yaw angle, a hip joint roll angle, a knee joint pitch angle, an ankle joint pitch angle, and an ankle joint roll angle that are associated with the right leg of the robot. The joint angles of the left leg are expressed as follows: $\theta_r=[\theta_{r1}\ \theta_{r2}\ \theta_{r3}\ \theta_{r4}\ \theta_{r5}\ \theta_{r6}]^T$.

Step S107: Control the robot to move according to the joint angles.

After the joint angles associated with the left leg and the right leg are obtained, the robot 11 can be controlled to move according to the joint angles, so as to realize compliance control of the robot 11.

With the robot control method describe above, the joint angles of the robot can be adjusted in real time according to the force information of the feet of the robot, which is beneficial to improve the stability of the robot during the walking process, and allows the robot to walk stably even in the case of various external environmental forces or uneven ground, thereby improving the performance of the robot.

It should be understood that sequence numbers in the foregoing processes do not indicate execution sequences. Execution sequences of the processes should be determined according to functions and internal logic of the processes, and shall not constitute any limitation on implementation processes of the embodiments of the present application.

Figure 8:
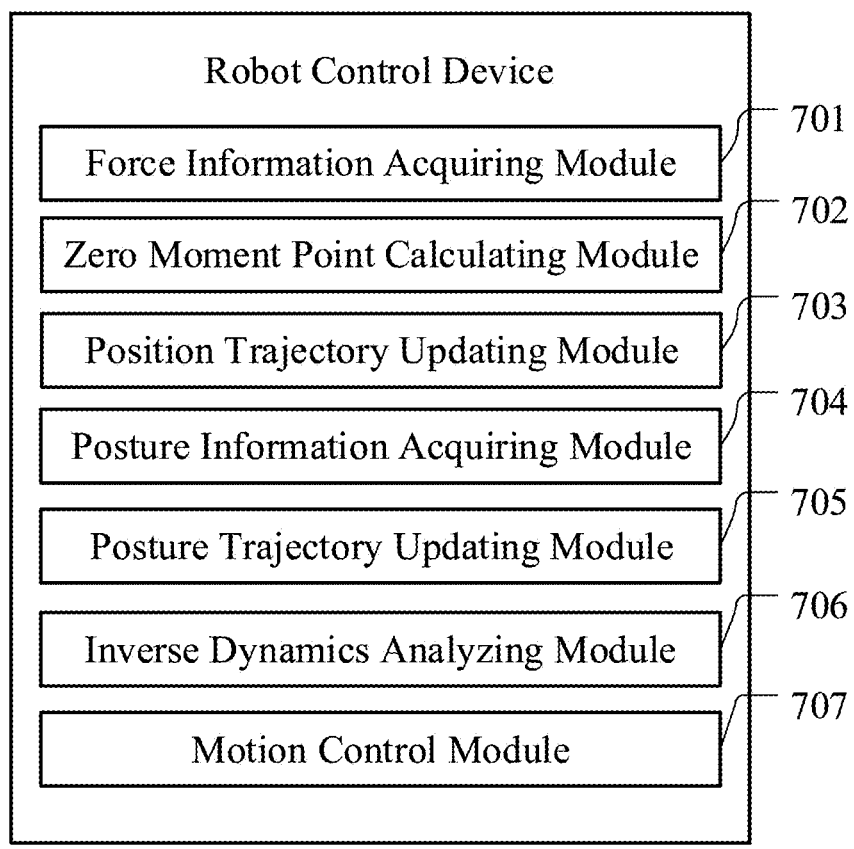
FIG. 8 is a schematic block diagram of a robot control device according to one embodiment.

Referring to FIG. 8, in one embodiment, a robot control device may include a force information acquiring module 701, a zero moment point calculating module 702, a position trajectory updating module 703, a posture information acquiring module 704, a posture trajectory updating module 705, an inverse dynamics analyzing module 706, and a motion control module 707.

The force information acquiring module 701 is configured to obtain force information associated with feet of the robot. The zero moment point calculating module 702 is configured to calculate a zero moment point of a COM of a body of the robot based on the force information. The position trajectory updating module 703 is configured to update a position trajectory of the COM of the robot according to the zero moment point of the COM of the body to obtain an updated position of the COM of the body. The posture information acquiring module 704 is configured to obtain posture information of the robot. The posture trajectory updating module 705 is configured to update a posture trajectory of the robot according to the posture information to obtain an updated pose angle. The inverse dynamics analyzing module 706 is configured to perform inverse kinematics analysis on the updated position of the COM of the body and the updated pose angle to obtain joint angles of legs of the robot. The motion control module 707 is configured to control the robot to move according to the joint angles.

Figure 9:
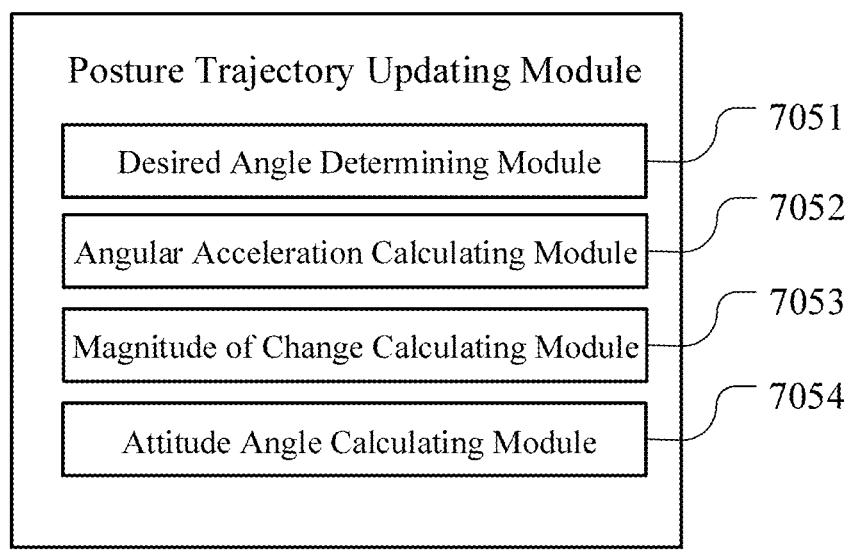
FIG. 9 is a schematic block diagram of a posture trajectory updating module according to one embodiment.

Referring to FIG. 9, in one embodiment, the posture trajectory updating module 705 may include a desired angle determining module 7051, an angular acceleration calculating module 7052, a magnitude of change calculating module 7053, and a pose angle calculating module 7054. The desired angle determining module 7051 is configured to determine a desired angle and a desired angular velocity of the robot according to the posture trajectory of the robot. The angular acceleration calculating module 7052 is configured to obtain an actual angular velocity of the robot, and calculate an angular acceleration of the robot according to the posture information, the actual angular velocity, the desired angle, and the desired angular velocity of the robot. The magnitude of change calculating module 7053 is configured to calculate magnitude of change in angle of the robot according to the angular acceleration of the robot and an angular velocity of the robot at a previous moment. The pose angle calculating module 7054 is configured to calculate the updated pose angle according to the posture information and the magnitude of change in angle.

In one embodiment, the angular acceleration calculating module 7052 may include a roll angular acceleration calculating sub-module and a pitch angular acceleration calculating sub-module. In one embodiment, the roll angular acceleration calculating sub-module can calculate a roll angular acceleration of the robot according to a formula as follows: $racc = K_{pr}(r_{dr}-r_r) + K_{dr}(w_{dr}-w_r)$, where $r_r$ represents a roll angle of the posture information, $r_{dr}$ represents a desired roll angle, $w_r$ represents an actual roll angular velocity around an x-axis, $w_{dr}$ represents a desired roll angular velocity around the x-axis, $K_{pr}$ represents a preset first coefficient, $K_{dr}$ represents a preset second coefficient, and racc represents the roll angular acceleration.

In one embodiment, the pitch angular acceleration calculating sub-module can calculate a pitch angular acceleration of the robot according to a formula as follows: $pacc = K_{pr}(r_{dp}-r_p) + K_{dr}(w_{dp}-w_p)$, where $r_p$ represents a pitch angle of the posture information, $r_{dp}$ represents a desired pitch angle, $w_p$ represents an actual pitch angular velocity, $w_{dp}$ represents a desired pitch angular velocity, and pacc represents the pitch angular acceleration.

Figure 10:
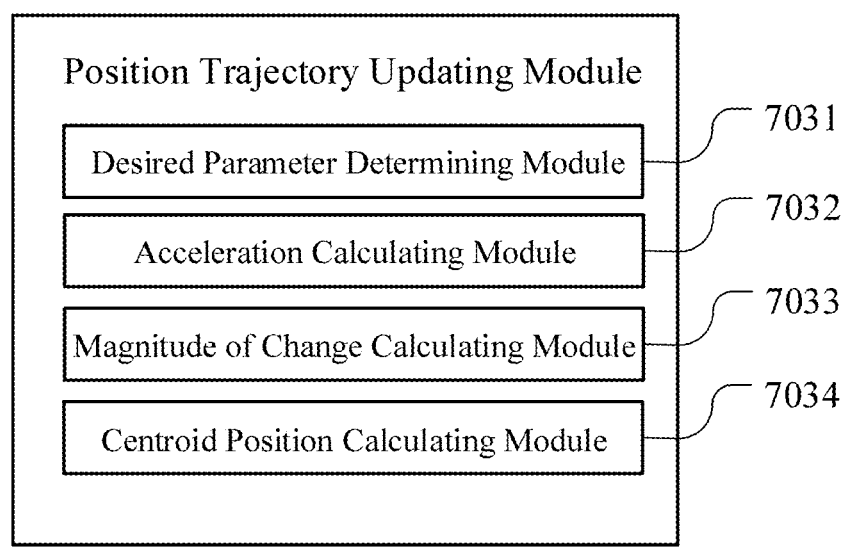
FIG. 10 is a schematic block diagram of a position trajectory updating module according to one embodiment.
Figure 11:
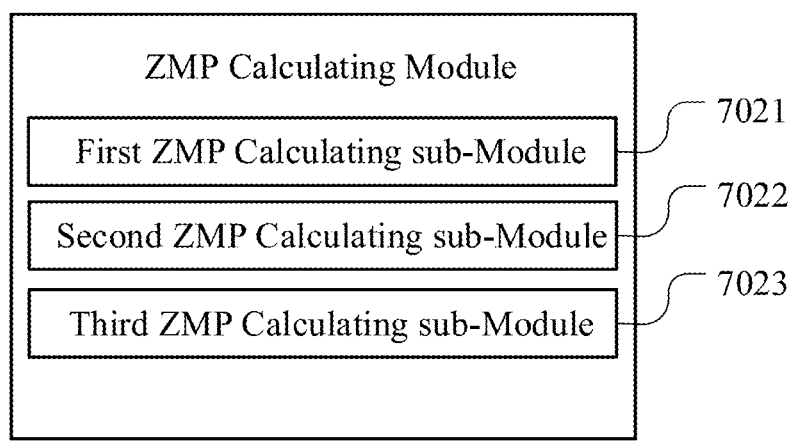
FIG. 11 is a schematic block diagram of a zero moment point calculating module according to one embodiment.

Referring to FIG. 10, in one embodiment, the position trajectory updating module 703 may include a desired parameter determining module 7031, an acceleration calculating module 7032, a magnitude of change calculating module 7033, and a COM position calculating module 7034. The desired parameter determining module 7031 is configured to determine a desired zero moment point and a desired position of the COM of the body according to the position trajectory of the robot 11. The acceleration calculating module 7032 is configured to acquire an actual position of the COM of the body, and calculate acceleration of the COM of the body according to the zero moment point, the actual position, the desired zero moment point, and the desired position of the COM of the body. The magnitude of change calculating module 7033 is configured to calculate magnitude of change in position of the COM of the body based on the acceleration of the COM of the body and speed of the COM of the body at a previous moment. The COM position calculating module 7034 is configured to calculate the updated position of the COM of the body according to the desired position of the COM of the body and the magnitude of change in position of the COM of the body.

In one embodiment, the acceleration calculating module 7032 may include a first acceleration calculating sub-module and a second acceleration calculating sub-module. The first acceleration calculating sub-module is configured to calculate the acceleration of the COM of the body on an x-axis according to a formula as follows: $a_x = K_{zmp}(p_{dx}-p_{bx}) + K_p(x_{dx}-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K_{zmp}$ represents a preset third coefficient, $K_p$ represents a preset fourth coefficient, $a_x$ represents the acceleration of the COM of the body on the x-axis.

The second acceleration calculating sub-module is configured to calculate the acceleration of the COM of the body on a y-axis according to a formula as follows: $a_y=K_{zmp}(p_{dy}-p_{by})+K_p(x_{dy}-x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a_y$ represents the acceleration of the COM of the body on the y-axis.

In one embodiment, the robot 11 may be a biped robot and the force information associated with the feet includes force information associated with the left and force information associated with the right foot of the robot 11. Referring to FIG. 11, the zero moment point calculating module 702 may include a first zero moment point calculating sub-module 7021, a second zero moment point calculating sub-module 7022, and a third zero moment point calculating sub-module 7023.

The first zero moment point calculating sub-module 7023 is configured to calculate a zero moment point of the left foot of the robot based on the force information associated with the left foot. The second zero moment point calculating sub-module 7022 is configured to calculate a zero moment point of the right foot of the robot based on the force information associated with the right foot. The third zero moment point calculating sub-module 7023 is configured to calculate the zero moment point of the COM of the body of the robot based on the zero moment point of the left foot and the zero moment point of the right foot.

In one embodiment, the third zero moment point calculating sub-module 7023 can calculate the zero moment point of the COM of the body of the robot according to formulas as follows:

$$p_{bx} = \frac{p_{rx} \times f_{rz} + p_{lx} \times f_{lz}}{f_{rz} + f_{lz}}; p_{by} = \frac{p_{ry} \times f_{rz} + p_{ly} \times f_{lz}}{f_{rz} + f_{lz}};$$

and
$p_b=[p_{bx} \ p_{by} \ 0]^T$, where $p_{bx}$ represents an x-coordinate of the zero moment point of the COM of the body, $p_{by}$ represents a y-coordinate of the zero moment point of the COM of the body, $f_{lz}$ represents a component of the force acting on the left foot on the z-axis, $f_{rz}$ represents a component of the force acting on the right foot on the z-axis, $p_{lx}$ represents an x-coordinate of the zero moment point of the left foot, $p_{ly}$ represents a y-coordinate of the zero moment point of the left foot, $p_{rx}$ represents an x-coordinate of the zero moment point of the right foot, $p_{ry}$ represents a y-coordinate of the zero moment point of the right foot, $p_b$ represents the zero moment point of the COM of the body.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method executed by one or more processors of a robot, the method comprising:
    obtaining force information associated with feet of the robot;
    calculating a zero moment point of a center of mass (COM) of a body of the robot based on the force information;
    updating a position trajectory of the COM of the robot according to the zero moment point of the COM of the body to obtain an updated position of the COM of the body;
    obtaining posture information of the robot;
    updating a posture trajectory of the robot according to the posture information to obtain an updated pose angle;
    performing inverse kinematics analysis on the updated position of the COM of the body and the updated pose angle to obtain joint angles of legs of the robot; and
    controlling the robot to move according to the joint angles;
    wherein updating the posture trajectory of the robot according to the posture information to obtain the updated pose angle, comprises:
    determining a desired angle and a desired angular velocity of the robot according to the posture trajectory of the robot;
    obtaining an actual angular velocity of the robot, and calculating an angular acceleration of the robot according to the posture information, the actual angular velocity, the desired angle, and the desired angular velocity of the robot;
    calculation magnitude of change in angle of the robot according to the angular acceleration of the robot and an angular velocity of the robot at a previous moment; and
    calculating the updated pose angle according to the posture information and the magnitude of change in angle.

2. The computer-implemented method according to claim 1, wherein calculating an angular acceleration of the robot according to the posture information, the actual angular velocity, the desired angle, and the desired angular velocity of the robot, comprises:
    calculating a roll angular acceleration of the robot according to a formula as follows: $racc=K_{pr}(r_{dr}-r_r)+K_{dr}(w_{dr}-w_r)$, where $r_r$ represents a roll angle of the posture information, $r_{dr}$ represents a desired roll angle, $w_r$ represents an actual roll angular velocity around an x-axis, $w_{dr}$ represents a desired roll angular velocity around the x-axis, $K_{pr}$ represents a preset first coefficient, $K_{dr}$ represents a preset second coefficient, and racc represents the roll angular acceleration; and
    calculating a pitch angular acceleration of the robot according to a formula as follows: $pacc=K_{pr}(r_{dp}-r_p)+K_{dr}(w_{dp}-w_p)$, where $r_p$ represents a pitch angle of the posture information, $r_{dp}$ represents a desired pitch angle, $w_p$ represents an actual pitch angular velocity around a y-axis, $w_{dp}$ represents a desired pitch angular velocity around the y-axis, and pacc represents the pitch angular acceleration.

3. The computer-implemented method according to claim 1, wherein updating the position trajectory of the robot according to the zero moment point of the COM of the body to obtain the updated position of the COM of the body, comprises:
    determining a desired zero moment point and a desired position of the COM of the body according to the position trajectory of the robot;
    acquiring an actual position of the COM of the body, and calculating acceleration of the COM of the body according to the zero moment point, the actual position, the desired zero moment point, and the desired position of the COM of the body;
    calculating magnitude of change in position of the COM of the body based on the acceleration of the COM of the body and speed of the COM of the body at a previous moment; and
    calculating the updated position of the COM of the body according to the desired position of the COM of the body and the magnitude of change in position of the COM of the body.

4. The computer-implemented method according to claim 3, wherein calculating acceleration of the COM of the body according to the zero moment point, the actual position, the desired zero moment point, and the desired position of the COM of the body, comprises:
    calculating the acceleration of the COM of the body on an x-axis according to a formula as follows: $a_x=K_{zmp}(p_{dx}-p_{bx})+K_p(x_{dx}-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K_{zmp}$ represents a preset third coefficient, $K_p$ represents a preset fourth coefficient, $a_x$ represents the acceleration of the COM of the body on the x-axis; and calculating the acceleration at the COM of the body on a y-axis according to a formula as follows: $a_y=K_{zmp}(p_{dy}-p_{by})+K_p(x_{dy}-x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a_y$ represents the acceleration of the COM of the body on the y-axis.

5. The computer-implemented method according to claim 1, wherein calculating the zero moment point of the COM of the body of the robot based on the force information, comprises:

calculating a zero moment point of a left foot of the robot based on force information associated with the left foot;

calculating a zero moment point of the right foot of the robot based on force information associated with the right foot; and calculating the zero moment point of the COM of the body of the robot based on the zero moment point of the left foot and the zero moment point of the right foot.

6. The computer-implemented method according to claim 5, wherein the zero moment point of the COM of the body of the robot is calculated according to formulas as follows:

$$p_{bx} = \frac{p_{rx} \times f_{rz} + p_{lx} \times f_{lz}}{f_{rz} + f_{lz}};$$

$$p_{by} = \frac{p_{ry} \times f_{rz} + p_{ly} \times f_{lz}}{f_{rz} + f_{lz}}; \text{ and}$$

$$p_b = [p_{bx} \ p_{by} \ 0]^T,$$

where $p_{bx}$ represents an x-coordinate of the zero moment point of the COM of the body, $p_{by}$ represents a y-coordinate of the zero moment point of the COM of the body, $f_{lz}$ represents a component of the force acting on the left foot on the z-axis, $f_{rz}$ represents a component of the force acting on the right foot on the z-axis, $p_{lx}$ represents an x-coordinate of the zero moment point of the left foot, $p_{ly}$ represents a y-coordinate of the zero moment point of the left foot, $p_{rx}$ represents an x-coordinate of the zero moment point of the right foot, $p_{ry}$ represents y-coordinate of the zero moment point of the right foot, $p_b$ represents the zero moment point of the COM of the body.

7. A non-transitory computer-readable storage medium storing one or more programs to be executed in a robot, the one or more programs, when being executed by one or more processors of the robot, causing the robot to perform processing comprising:

obtaining force information associated with feet of the robot;

calculating a zero moment point of a center of mass (COM) of a body of the robot based on the force information;

updating a position trajectory of the COM of the robot according to the zero moment point of the COM of the body to obtain an updated position of the COM of the body;

obtaining posture information of the robot;

updating a posture trajectory of the robot according to the posture information to obtain an updated pose angle;

performing inverse kinematics analysis on the updated position of the COM of the body and the updated pose angle to obtain joint angles of legs of the robot; and controlling the robot to move according to the joint angles;

wherein updating the posture trajectory of the robot according to the posture information to obtain the updated pose angle, comprises:

determining a desired angle and a desired angular velocity of the robot according to the posture trajectory of the robot;

obtaining an actual angular velocity of the robot, and calculating an angular acceleration of the robot according to the posture information, the actual velocity, the desired angle, and the desired angular velocity of the robot;

calculating magnitude of change in angle of the robot according to the annular acceleration of the robot and an annular velocity of the robot at a previous moment; and calculating the updated pose angle according to the posture information and the magnitude of change in angle.

8. The non-transitory computer-readable storage medium according to claim 7, wherein calculating an angular acceleration of the robot according to the posture information, the actual angular velocity, the desired angle, and the desired angular velocity of the robot, comprises:

calculating a roll angular acceleration of the robot according to a formula as follows: $racc=K_{pr}(r_{dr}-r_r)+K_{dr}(w_{dr}-w_r)$, where $r_r$ represents a roll angle of the posture information, $r_{dr}$ represents a desired roll angle, $w_r$ represents an actual roll angular velocity around an x-axis, $w_{dr}$ represents a desired roll angle, $w_r$ represents an actual roll angular velocity represents a preset first coefficient, $K_{dr}$ represents a preset second coefficient, and racc represents the roll angular acceleration; and calculating a pitch angular acceleration of the robot according to a formula as follows: $pacc=K_{pr}(r_{dp}-r_p)+K_{dr}(w_{dp}-w_p)$, where $r_p$ represents a pitch angle of the posture information, $r_{dp}$ represents a desired pitch angle, $w_p$ represents an actual pitch angular velocity around a y-axis, $w_{dp}$ represents a desired pitch angular velocity mound the y-axis, and pace represents the pitch angular acceleration.

9. The non-transitory computer readable storage medium according to claim 7, wherein updating the position trajectory of the robot according to the zero moment point of the COM of the body to obtain the updated position the COM of the body, comprises:

determining a desired zero moment point and a desired position of the COM of the body according to the position trajectory of the robot;

acquiring an actual position of the COM of the body, and calculating acceleration of the COM of the body according to the zero moment point, the actual position, the desired zero moment point, and the desired position of the COM of the body;

calculating magnitude of change in position of the COM of the body based on the acceleration of the COM of the body and speed of the COM of the body at a previous moment; and calculating the updated position of the COM of the body according to the desired position of the COM of the body and the magnitude of change in position of the COM of the body.

10. The non-transitory computer-readable storage medium according to claim 9, wherein calculating acceleration of the COM of the body according to the zero moment point, the actual position, the desired zero moment point, and the desired position of the COM of the body, comprises:
  calculating the acceleration of the COM of the body on an x-axis according to a formula as follows: $a_x=K_{zmp}(p_{dx}-p_{bx})+K_p(x_{dx}-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K_{zmp}$ represent a preset third coefficient $K_p$ represents a preset fourth coefficient, $a_x$ represents the acceleration of the COM of the body on the axis; and
  calculating the acceleration of the COM of the body on a y-axis according to a formula as follows: $a_y=K_{zmp}(p_{dy}-p_{by})+K_p(x_{dy}-x_{ry})$, where $p_{by}$ represents y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a_y$ represents the acceleration of the COM of the body on the y-axis.

11. The non-transitory computer-readable storage medium according to claim 7, wherein calculating the zero moment point of the COM of the body of the robot based on the force information, comprises:
  calculating a zero moment point of a left foot of the robot based on force information associated with the left foot;
  calculating a zero moment point of the right foot of the robot based on force information associated with the right foot; and
  calculating the zero moment point of the COM of the body of the robot based on the zero moment point of the left foot and the zero moment point of the right foot.

12. The non-transitory computer-readable storage medium according to claim 11, wherein the zero moment point of the COM of the body of the robot is calculated according to formulas as follows:

$$p_{bx} = \frac{p_{rx} \times f_{rz} + p_{lx} \times f_{lz}}{f_{rz} + f_{lz}};$$

$$p_{by} = \frac{p_{ry} \times f_{rz} + p_{ly} \times f_{lz}}{f_{rz} + f_{lz}}; \text{ and}$$

$$p_b = [p_{bx} \ p_{by} \ 0]^T,$$

where $p_{bx}$ represents an x-coordinate of the zero moment point of the COM of the body, $p_{by}$ represents a y-coordinate of the zero moment point of the COM of the body, $f_{lz}$ represents a component of the force acting on the left foot on the z-axis, $f_{rz}$ represents a component of the force acting on the right foot on the z-axis, $p_{lx}$ represents an x-coordinate of the zero moment point of the left foot, $p_{ly}$ represents a y-coordinate of the zero moment point of the left foot, $p_{rx}$ represents an x-coordinate of the zero moment point of the right foot, $p_{ry}$ represents a y-coordinate of the zero moment point of the right foot, $p_b$ represents the zero moment point of the COM of the body.

13. A robot comprising:
one or more processors;
a memory; and
one or more programs, wherein the one or more programs are stored in the memory and configured to be executed by the one or more processors, the one or more programs comprises:
  instructions for obtaining force information associated with feet of the robot;
  instructions for calculating a zero moment point of a center of mass (COM) of a body of the robot based on the force information;
  instructions for updating a position trajectory of the COM of the robot according to the zero moment point of the COM of the body to obtain an updated position of the COM of the body;
  instructions for obtaining posture information of the robot;
  instructions for updating a posture trajectory of the robot according to the posture information to obtain an updated pose angle;
  instructions for performing inverse kinematics analysis on the updated position of the COM of the body and the updated pose angle to obtain joint angles of legs of the robot; and
  instructions for controlling the robot to move according to the joint angles;
  wherein updating the position trajectory of the robot according to the zero moment point of the COM of the body to obtain the updated position of the COM of the body, comprises:
  determining a desired zero moment point and a desired position of the COM of the body according to the position trajectory of the robot;
  acquiring an actual position of the COM of the body, and calculating acceleration of the COM of the body according to the zero moment point, the actual position, the desired zero moment point, and the desired position of the COM of the body;
  calculating magnitude of change in position of the COM of the body based on the acceleration of the COM of the body and speed of the COM of the body at a previous moment; and
  calculating the updated position of the COM of the body according to the desired position of the COM of the body and the magnitude of change in position of the COM of the body.

14. The robot according to claim 13, wherein updating the posture trajectory of the robot according to the posture information to obtain the updated pose angle, comprises:
  determining a desired angle and a desired angular velocity of the robot according to the posture trajectory of the robot;
  obtaining an actual angular velocity of the robot, and calculating an angular acceleration of the robot according to the posture information, the actual angular velocity, the desired angle, and the desired angular velocity of the robot;
  calculating magnitude of change in angle of the robot according to the angular acceleration of the robot and an angular velocity of the robot at a previous moment; and
  calculating the updated pose angle according to the posture information and the magnitude of change in angle.

15. The robot according to claim 14, wherein calculating an angular acceleration of the robot according to the posture information, the actual angular velocity, the desired angle, and the desired angular velocity of the robot, comprises:
  calculating a roll angular acceleration of the robot according to a formula as follows: $racc=K_{pr}(r_{dr}-r_r)+K_{dr}(w_{dr}-$ $w_r$), where $r_r$ represents a roll angle of the posture information, $r_{dr}$ represents a desired roll angle, $w_r$ represents an actual roll angular velocity around an x-axis, $w_{dr}$ represents a desired roll angular velocity around the x-axis, $K_{pr}$ represents a preset first coefficient, $K_{dr}$ represents a preset second coefficient, and racc represents the roll angular acceleration; and calculating a pitch angular acceleration of the robot according to a formula as follows: pacc=$K_{pr}(r_{dp}-r_p)$+$K_{dr}(w_{dp}-w_p)$, where $r_p$ represents a pitch angle of the posture information, $r_{dp}$ represents it desired pitch angle, $w_p$ represents an actual pitch angular velocity around a y-axis, $w_{dp}$ represents a desired pitch angular velocity around the y-axis, and pacc represents the pitch angular acceleration.

16. The robot according to claim 13, wherein calculating acceleration of the COM of the body according to the zero moment point, the actual position, the desired zero moment point, and the desired position of the COM of the body comprises:

calculating the acceleration of the COM of the body on an x-axis according to a formula as follows: $a_x$=$K_{zmp}(p_{dx}-p_{bx})$+$K_p(x_{dx}-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K_{zmp}$ represents a preset third coefficient, $K_p$ represents a preset fourth coefficient, $a_x$ represents the acceleration of the COM of the body on the x-axis; and calculating the acceleration at the COM of the body on a y-axis according to a formula as follows: $a_y$=$K_{zmp}(p_{dy}-p_{by})$+$K_p(x_{dy}-x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a_y$ represents the acceleration of the COM of the body on the y-axis.

17. The robot according to claim 13, wherein calculating the zero moment point of the COM of the body of the robot based on the force information, comprises:

calculating a zero moment point of a left foot of the robot based on force information associated with the left foot;

calculating a zero moment point of the right foot of the robot based on force information associated with the right foot; and calculating the zero moment point of the COM of the body of the robot based on the zero moment point of the left foot and the zero moment point of the right foot.

18. The robot according to claim 17, wherein the zero moment point of the COM of the body of the robot is calculated according to formulas as follows:

$$p_{bx} = \frac{p_{rx} \times f_{rz} + p_{lx} \times f_{lz}}{f_{rz} + f_{lz}};$$

$$p_{by} = \frac{p_{ry} \times f_{rz} + p_{ly} \times f_{lz}}{f_{rz} + f_{lz}}; \text{ and}$$

$$p_b = [p_{bx} \quad p_{by} \quad 0]^T,$$

where $p_{bx}$ represents an x-coordinate of the zero moment point of the COM of the body, $p_{by}$ represents a y-coordinate of the zero moment point of the COM of the body, $f_{lz}$ represent a component of the force acting on the left foot on the z-axis, $f_{rz}$ represents a component of the force acting on the right foot on the z-axis, $p_{lx}$ represents an x-coordinate of the zero moment point of the left foot, $p_{ly}$ represents a y-coordinate of the zero moment point of the left foot, $p_{rx}$ represents an x-coordinate of the zero moment point of the right foot, $p_{ry}$ represents a y-coordinate of the zero moment point of the right foot, $p_b$ represents the zero moment point of the COM of the body.

\* \* \* \* \*